United States Patent Office 3,432,103
Patented Mar. 11, 1969

3,432,103
DISHWASHER SPRAY APPARATUS WITH GRADUALLY INCREASING NOZZLE PRESSURE
Johannes Hoppen, Schwelm, Westphalia, Germany, assignor to North American Philips Company, Inc., New York, N.Y., a corporation of Delaware
Filed Feb. 14, 1967, Ser. No. 616,070
Claims priority, application Germany, Feb. 15, 1966,
G 46,039
U.S. Cl. 239—255          2 Claims
Int. Cl. B05b 3/06; B08b 3/02

ABSTRACT OF THE DISCLOSURE

Dishwasher spray apparatus using a centrifugal pump rotor with peripheral outlet and a secondary outlet. The secondary outlet empties into a prechamber which is connected in turn to the peripheral outlet and provides a gradually increasing pressure at a nozzle connected to the peripheral outlet.

---

Figure 1:
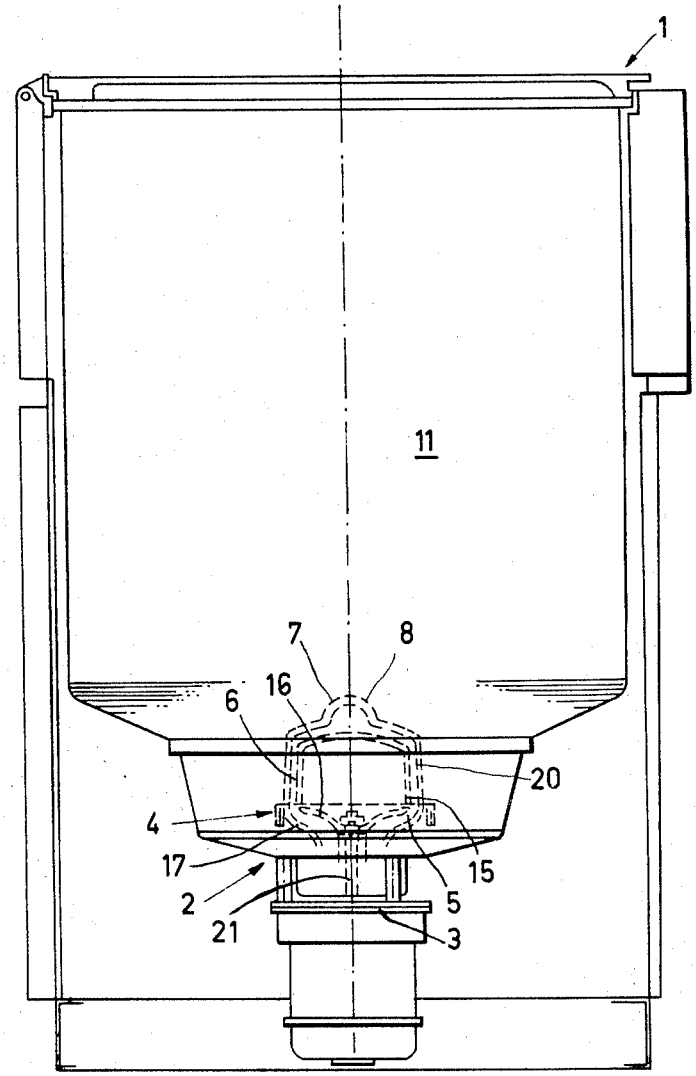

The invention relates to a dishwasher having a washing and rinsing space and a centrifugal pump which has an axial water input, an output conduit arranged along the periphery of the pump rotor and a water distributor connected thereto and provided with nozzles or the like. Dishwashers of this kind are known.

The water distributor is provided with stationary or movable water nozzles. In these known dishwashers, it is disturbing that, when the pump generally driven by a simple asynchronous electric motor is switched on, the water pressure is attained very abruptly so that water having a high kinetic energy nearly immediately flows out of the water nozzles and may cause damage to the dishes to be rinsed if the rinsing space contains light dishes which are not safely arranged and are liable to tilt. In order to avoid this disadvantage, electrical or mechanical means (series resistors on the driving motor, clutches, driving gear) could cause the pump to start slowly, but this is complicated and expensive.

The invention has for an object to provide apparatus which gradually increases the pressure in the nozzle when the pump is switched on and it is characterized in that a prechamber is connected parallel to the output conduit of the water distributor. The prechamber is drained simultaneously with the washing and rinsing space when the pump is switched off.

A preferred embodiment of the invention is characterized in that the prechamber joins the output conduit at its beginning. By a suitable choice of the size of the prechamber and suitable proportioning of the connection to the output conduit, it can invariably be ensured that despite the rapid starting of the pump which immediately reaches its full speed, the water pressure is attained comparatively slowly. Thus, the disadvantages described in the preamble can be completely avoided.

Various constructions are possible without departing from the scope of the invention. A preferred embodiment of the invention is characterized in that the prechamber is arranged above the centrifugal pump and joins by its upper side the output conduit in the region where the latter is connected to the water distributor. This embodiment is used especially if in the dishwasher according to the invention, the water pump is disposed in effect in the base of the washing and rinsing space or in a separate dish shaped part arranged below it. In this case, according to the invention, the prechamber may be arranged in the form of a hood above the pump rotor and may be surrounded by an outer hood, the space between the hoods constituting the output conduit to the water distributor arranged centrally above the hood. Thus, a further very simple construction is obtained with respect to the connection between the prechamber and the output conduit. This embodiment is characterized in that the pump rotor has bores through which the prechamber communicates with the interior of the rotor. The bores are proprotioned in accordance with the rate at which the pressure should be attained. According to the invention, they are preferably arranged on a circle, the diameter of the circle being approximately half the outer diameter of the rotor. It has been found that the efficiency of the pump is not adversely affected at all by these bores. According to the invention, the water distributor preferably has the form of a tumbling-jet apparatus constituted by a nozzle head suspended by means of a ball-joint and having a counterweight provided on a central shaft. The advantageous features according to the invention described above are also obtained in this case. Moreover, a favorable effect is obtained if, according to a further embodiment of the invention, the ball-joint of the tumbling-jet apparatus is journalled above the prechamber and the counterweight is disposed inside the space formed by the prechamber. In this case, the counterweight in effect operates as a rotor in a water motor which consists of the hood and the counterweight, while the water entering the interior of the hood and the prechamber, respectively, and propelled by the water pump acts upon the counterweight and thus initiates the movement of the tumbling-jet apparatus. If in this case the pump rotor is provided with bores through which the interior of the hood communicates with the interior of the rotor, the movement of the tumbling-jet apparatus is initiated substantially immediately after the pump has been switched on. In addition the pressure is attained gradually and with a certain delay so that due to the fact that the tumbling-jet apparatus starts rapidly and the pressure of the water flowing out of the nozzles is attained gradually, it can invariably be ensured that dishes disposed in the washing and rinsing space are not damaged even though, they are light and liable to tilt. Since dishwashers provided with the tumbling-jet apparatus described generally start comparatively slowly, according to the invention, a considerable improvement of the operation of this kind of dishwasher is obtained. The invention is therefore of particular importance for these dishwashers.

Figure 2:
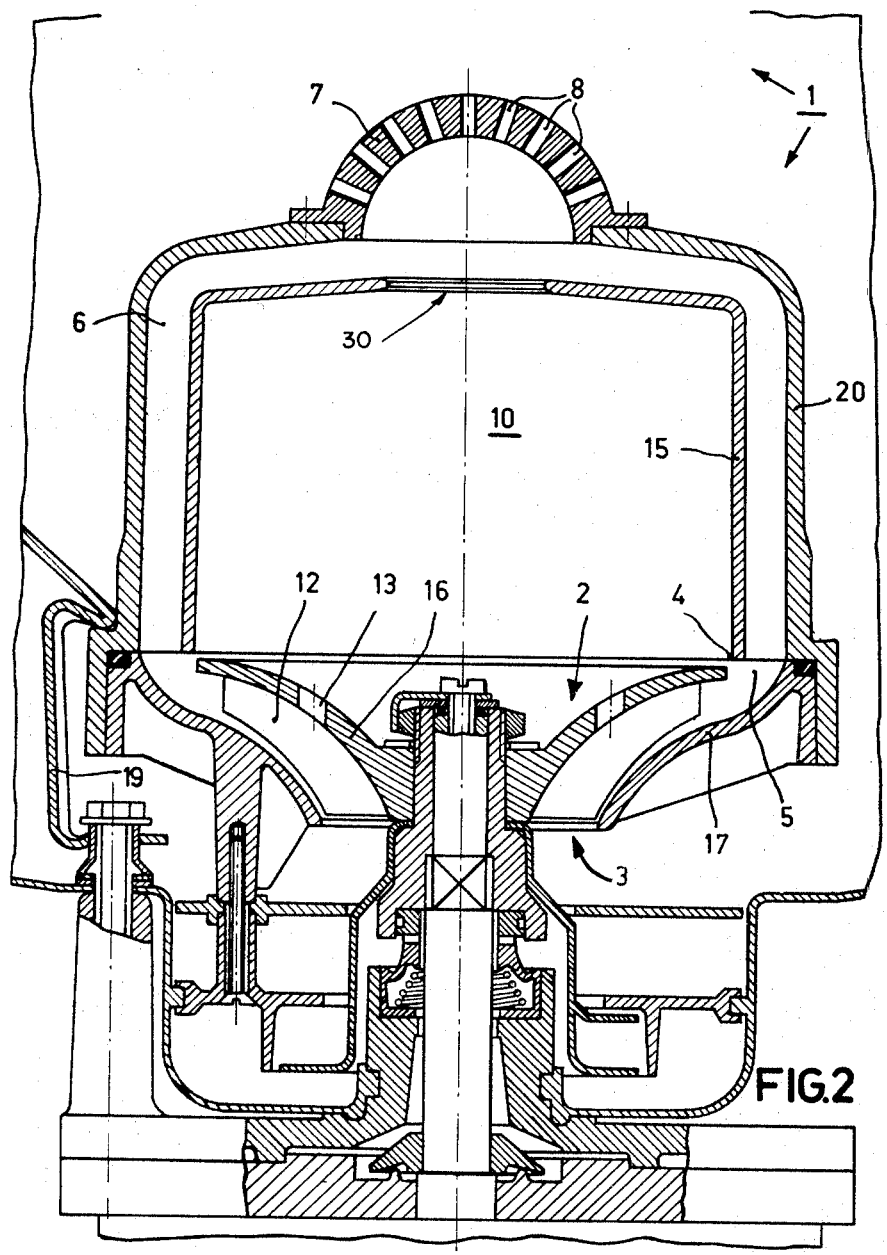
Figure 3:
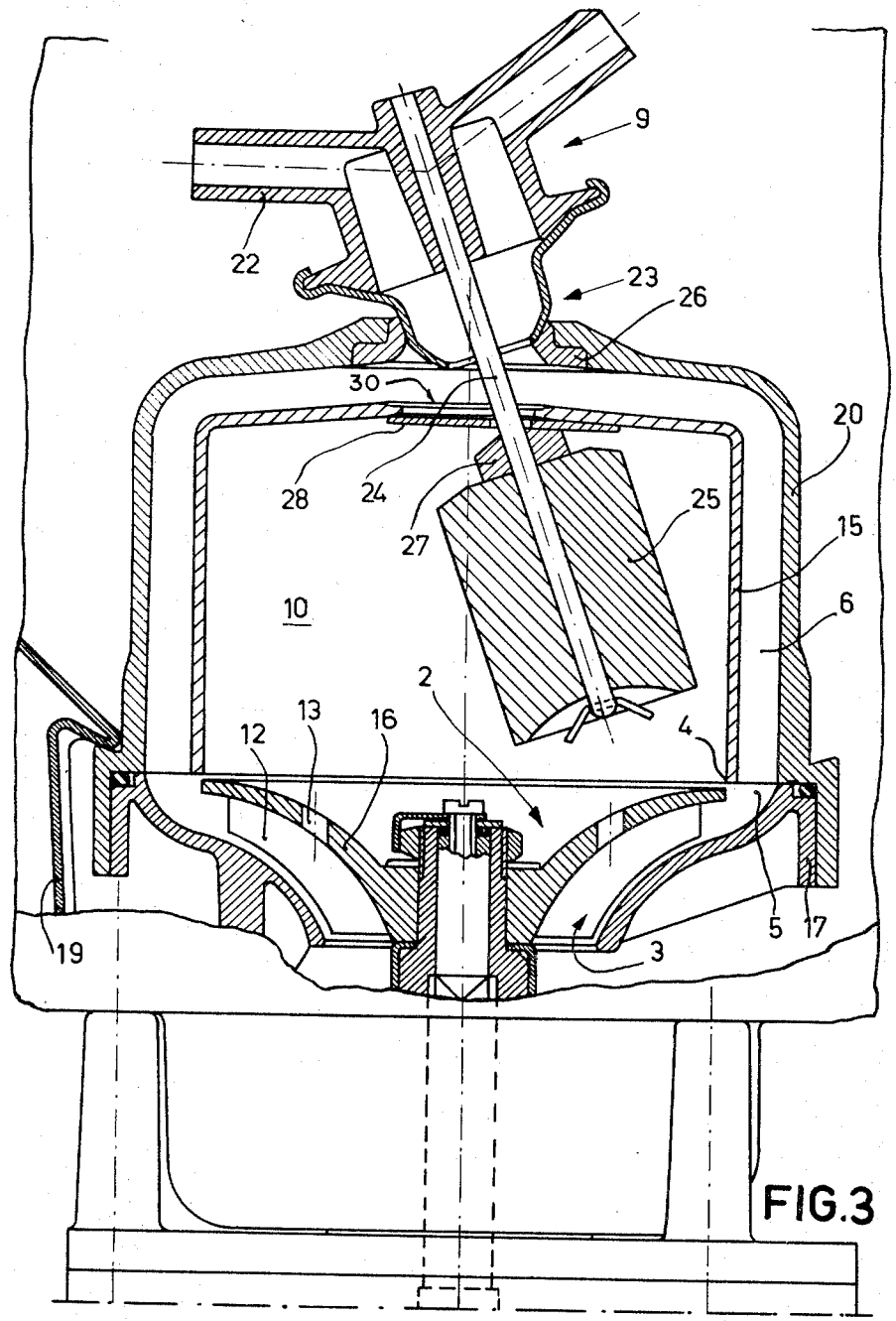

The invention will now be described more fully with reference to the accompanying drawing, in which:

FIG. 1 is an axial sectional view of an embodiment of a dishwasher according to the invention, FIG. 2 shows on an enlarged scale part of the device shown in FIG. 1, FIG. 3 is a sectional view corresponding with that of FIG. 2 of an alternative embodiment of a dishwasher according to the invention.

The dishwasher 1 shown in the figures is provided with a water pump taking the form of a centrifugal pump 2. It is apparent from the sectional views of FIGS. 2 and 3 that this centrifugal pump 2 has a substantially axial water input 3 and an output conduit 5 arranged along the periphery of the pump rotor 16, while a water distributor 7 having nozzles 8 is connected through a supply conduit 6 to the output conduit 5. In the embodiment of FIGS. 1 and 2, the water distributors are stationary and in FIG. 3, use is made of a water distributor having the form of a tumbling-jet apparatus 9 which will be described below.

The output conduit 5 is joined by a prechamber 10 which, when the pump is switched off, can be drained simultaneously with a washing and rinsing space.

In the embodiment shown, the prechamber 10 is arranged above the water pump 2 and has the form of a hood 15 provided above the pump rotor 16 and placed at 4 on the pump housing 17. The clamp 19 constitutes the securing member. This hood 15 apertured at 30 is surrounded at a certain distance by a second hood 20 so that the space between the hoods 15 and 20 constitutes the supply conduit 6 for the water distributor 7 arranged centrally above the hood 15. The connection between the prechamber 10 and the interior 12 of the rotor is established in this embodiment in that the pump rotor 16 is provided with bores 13 which are proportioned in accordance with the rate at which the pressure should be attained. It is efficacious if the bores 13 are arranged on a circle the diameter of which is approximately half the outer diameter of the rotor.

FIG. 3 shows an embodiment of the dishwasher 1 according to the invention in which the water distributor has the form of a tumbling-jet apparatus 9 which consists of a nozzle head 22 suspended by means of a ball-joint 23 and of a counterweight 25 arranged on a central shaft 24 which passes through aperture 30 at the top of hood 15. The tumbling-jet apparatus 9 is suspended at 26 in the outer hood 20 centrally of the hood arranged above the pump rotor 16 and designed to supply the water to the tumbling-jet apparatus 9. The counterweight 25 is disposed inside the hood 15. In this case, as in the embodiment of FIGS. 1 and 2, a space is left between the hoods 15 and 20 which constitutes the supply conduit 6 to the tumbling-jet apparatus 9. Otherwise, the hoods correspond with the hoods 15 and 20 shown in FIGS. 1 and 2. In this embodiment, provision is also made of an inner sheath and an outer sheath. The interior of this hood 15 in which the counterweight 25 is disposed in the case constitutes the prechamber 10. Apart from the fact that the pressure is gradually attained, this results in that the counterweight 25 in effect operates as the rotor of a water motor which is acted upon by the water entering the prechamber 10 through the bores 13 in the pump rotor 16. Consequently, it is ensured that the pressure is attained gradually and also that the tumbling-jet apparatus 9 starts rapidly. Also in this case, the efficacious arrangement is such that the pump rotor 16 has bores 13 through which the interior 12 of the rotor communicates with the prechamber 10. The area at which the central shaft 24 of the nozzle head 22 of the tumbling-jet apparatus 9 is passed through the inner sheath or the hood 15 can be closed entirely or in part; for this purpose, this embodiment includes a conical ring 27 co-operating with a closing plate 28.

Apart from the advantages already described, the dishwashers according to the invention and more particularly the embodiment shown in FIG. 3 have the additional advantage that the sensitivity to foam—which exists in known machines of the said kind when foam has accumulated in the hood 15 which accommodates the counterweight 25—is completely eliminated.

What is claimed is:
1. Dishwasher spray apparatus comprising an outer chamber, spray nozzle means on said outer chamber, a prechamber within said outer chamber and spaced from the walls of said outer chamber, a centrifugal pump rotor rotatably mounted adjacent said outer chamber and said prechamber, said rotor having an axial inlet, a peripheral outlet communicating with the space between said outer chamber walls and said prechamber walls and having at least one bore extending transversely through said rotor intermediate said inlet and said outlet and communicating with said prechamber, the space between said outer chamber walls and said inner chamber walls defining a conduit between the peripheral outlet of said pump rotor and said spray nozzle means, and means for connecting the lower portion of said prechamber to drainage means thereof.

2. Apparatus as claimed in claim 1, wherein said spray nozzle means comprises a universal joint in said outer chamber, a spray nozzle rotatably mounted in said universal joint, said joint and said nozzle defining a conduit for liquid between said walls of said outer chamber and said prechamber, a shaft connected to said nozzle and extending into said prechamber and a weight connected to said shaft and disposed within said prechamber, and wherein said bores through said rotor are arranged in a circle the diameter of which is approximately one-half the outer diameter of the rotor.

References Cited

UNITED STATES PATENTS 2,967,024  1/1961  Aubert _____ 239—261
3,180,348  4/1965  Clearman _____ 239—251 X ALLEN N. KNOWLES, *Primary Examiner.*

HOWARD NATTER, *Assistant Examiner.*

U.S. Cl. X.R.

134—176, 191; 239—261, 262